Aug. 5, 1952  F. J. COUCH  2,605,676
REARVIEW MIRROR ASSEMBLY
Filed Sept. 19, 1950
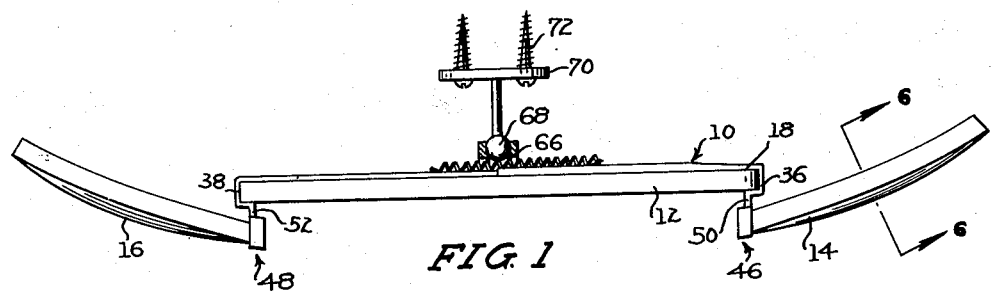
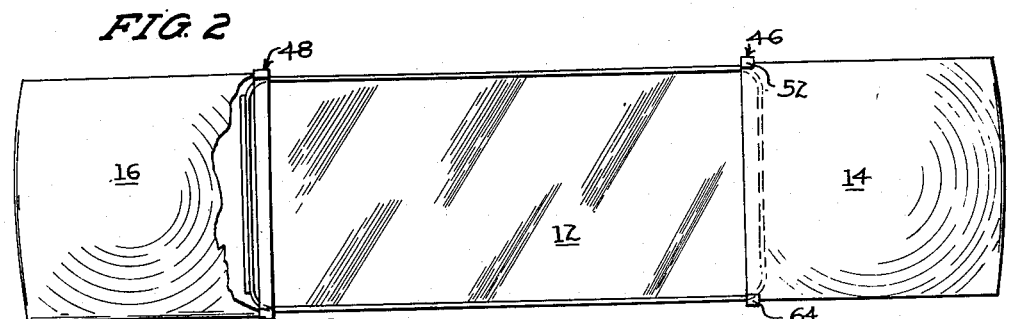
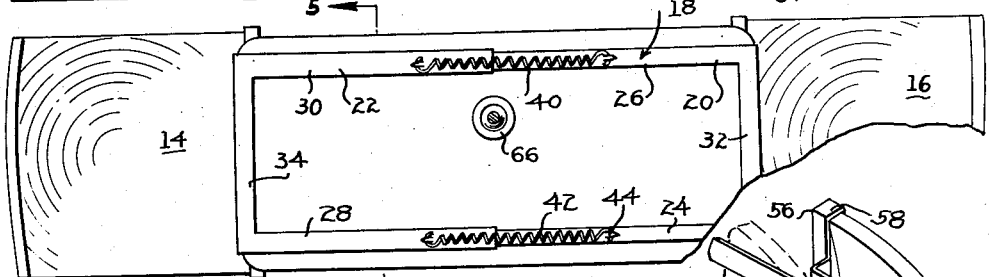
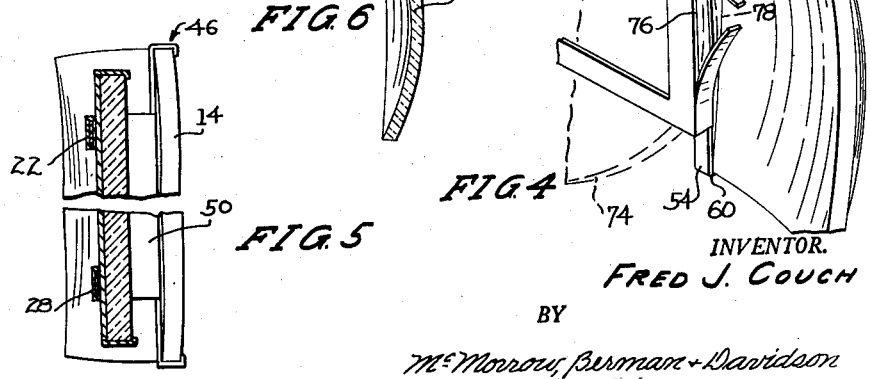
INVENTOR.
FRED J. COUCH
BY
McMorrow, Berman + Davidson
ATTORNEYS Patented Aug. 5, 1952

2,605,676

UNITED STATES PATENT OFFICE 2,605,676

REARVIEW MIRROR ASSEMBLY

Fred J. Couch, Sapulpa, Okla.

Application September 19, 1950, Serial No. 185,527

2 Claims. (Cl. 88—87)

This invention appertains to improvements in rear view mirrors for motor vehicles and has for its primary object to increase the visibility zone of the driver by augmenting the conventional rear view mirror with convexly curved side view mirrors.

Another important object of this invention is to provide a rear view mirror unit having a centrally disposed flat surface mirror and convexly curved end mirrors.

Another important object of this invention is to provide a mounting bracket for attaching a rear view mirror unit consisting of a centrally disposed elongated flat mirror and convexly curved end or wing mirrors to a motor vehicle.

These and ancillary objects and structural features of merit are attained by this invention, the preferred embodiments of which are set forth in the following description and illustrated in the accompanying drawing, wherein:

Figure 1 is a top plan view of the mirror unit and supporting bracket;

Figure 2 is a front elevational view thereof;

Figure 3 is a rear elevational view thereof;

Figure 4 is a fragmentary perspective view of a modified form of supporting bracket;

Figure 5 is a transverse sectional view taken on line 5—5 of Figure 3, and,

Figure 6 is a transverse sectional view taken on line 6—6 of Figure 1.

Referring now more particularly to the accompanying drawing, the rear view mirror assembly 10 includes an elongated flat centrally disposed mirror 12 and a pair of convexly curved end mirrors 14 and 16.

The mirrors 14 and 16 are curved convexly both horizontally and vertically and are mounted by the supporting bracket 18 at the opposing ends of the center mirror 12. The center mirror 12 functions as a normal rear view mirror to present a driver with a direct view rearwardly of the vehicle and the end mirrors 14 and 16 augment the center mirror by presenting a view from both sides of the vehicle.

The supporting bracket 18 includes a pair of U-shaped telescopically arranged members 20 and 22, the parallel legs 24 and 26 of the member 20 telescoping within the legs 28 and 30 of the companion member 22. The bight portions 32 and 34 of the members are vertically arranged in opposed relation and the same are formed with lateral forwardly projecting flanges 36 and 38. The opposing vertical edges of the mirror 12 are engaged on the flanges and springs 40 and 42 are provided to clamp the flanges on the opposing vertical edges of the mirror. The springs 40 and 42 normally retain the telescopic members in telescoped relation and, as seen in Figure 3, are connected to the telescopic frames of the bracket member. In this respect, lugs or keepers 44 project outwardly from the legs and the opposing ends of the springs are hooked thereon.

Clamps 46 and 48 are carried by the flanges and project outwardly therefrom, the clamps supporting the end or wing mirrors 14 and 16. The clamps 46 and 48 are offset from the end flanges 36 and 38 and are attached thereto by integral angular webs 50 and 52 which extend inwardly and outwardly from the flanges. The clamps include vertically opposed L-shaped arms 54 and 56 which project upwardly and downwardly from the attaching webs 50 and 52. The opposing horizontal sections 58 and 60 of the arms engage on the upper and lower edges of the mirrors 14 and 16 and lateral clamping flanges 62 and 64 are formed on the outer ends thereof to engage on the outer surface of the mirrors at the upper and lower edges thereof.

The flat mirror 12 is formed with a centrally disposed rearwardly projecting socket 66 within which the ball 68 carried by attaching bracket 70 is disposed. The bracket 70 is secured by the fasteners 72 or by any other suitable attaching means to the vehicle above the windshield.

If desired, an elliptical shaped mirror 74 may be substituted for the mirror 12 and to accommodate a mirror of this shape, a vertical opening 76 is formed in the flanges 36 and 38, as seen in Figure 4. The opposing ends 78 of the mirror 74 are received in the openings 76. The openings 76 are formed, as seen in Figure 4, by forming parallel vertical slits in the flanges and a center transverse slit. The sections of the flanges bounded by these slits form the outwardly struck arms 80 which clamp on the end 78 of the mirror 74 and securely anchor the mirror in the end flanges 36 and 38.

Due to the extensibility of the supporting bracket 18, any type of conventional rear view mirror may be supported therein, various changes such as that disclosed in Figure 4 being effected in order to more easily accommodate the mirrors, depending upon the configuration thereof.

In assembling the mirror unit, it can be seen that the end mirrors 14 and 16 are clamped by the clamps 46 and 48 at their inner vertical edges to the bracket and the members 20 and 22 are extended to receive the center mirror 12.

Having thus described the invention, what is claimed is:

1. A rear view mirror assembly comprising an elongated flat mirror, a pair of telescoping companion sections forming a longitudinally extensible bracket lying in the plane of the rear face of said mirror, means normally retaining said sections in clamping engagement with the mirror, lateral forwardly projecting flanges formed on the outer end of each section and engaging the side edges of the mirror, an inwardly projecting lip on each of said flanges bent at an angle to the flange and lying in the plane of the front face of the mirror, clamps carried by said lips and extending forwardly thereof, and convexly curved mirrors having one of their edges held in said clamps, said convexly curved mirrors forming end extensions of the centrally disposed flat mirror and overlapping the vertical edges of said flat mirror.

2. A rear view mirror assembly comprising an elongated flat mirror, a pair of telescoping companion sections forming a longitudinally extensible bracket lying in the plane of the rear face of the mirror, each of said sections being substantially U-shaped and consisting of a pair of spaced legs paralleling the horizontal edges of the mirror and an interconnecting member paralleling a vertical edge of the mirror and forming the outer end of each section, means normally retaining said sections in clamping engagement with the mirror, lateral forwardly projecting flanges formed on the outer end of each section and engaging the side edges of the mirror, an inwardly projecting lip on each of said flanges bent at an angle to the flange and lying in the plane of the front face of the mirror, clamps carried by said lips and extending forwardly thereof, and convexly curved mirrors having one of their edges held in said clamps, said convexly curved mirrors forming end extensions of the centrally disposed flat mirror and overlapping the vertical edges of said flat mirror.

FRED J. COUCH.

REFERENCES CITED

The following references are of record in the file of this patent:

UNITED STATES PATENTS

| Number | Name | Date |
| --- | --- | --- |
| D. 90,932 | De Hart | Oct. 24, 1933 |
| 1,276,512 | Faure | Aug. 20, 1918 |
| 1,643,420 | Porter | Sept. 27, 1927 |
| 1,895,560 | Weir | Jan. 31, 1933 |
| 2,499,747 | Griffith | Mar. 7, 1950 |

FOREIGN PATENTS

| Number | Country | Date |
| --- | --- | --- |
| 341,481 | Great Britain | Jan. 16, 1931 |